(12) United States Patent
Dirnberger

(10) Patent No.: US 12,470,554 B2
(45) Date of Patent: Nov. 11, 2025

(54) METHOD IN A SECURE ELEMENT

(71) Applicant: GIESECKE+DEVRIENT MOBILE SECURITY GERMANY GMBH, Munich (DE)

(72) Inventor: Wolfgang Dirnberger, Baldham (DE)

(73) Assignee: GIESECKE+DEVRIENT MOBILE SECURITY GERMANY GMBH, Munich (DE)

( * ) Notice: Subject to any disclaimer, the term of this patent is extended or adjusted under 35 U.S.C. 154(b) by 84 days.

(21) Appl. No.: 18/685,360

(22) PCT Filed: Aug. 19, 2022

(86) PCT No.: PCT/EP2022/025382
§ 371 (c)(1),
(2) Date: Feb. 21, 2024

(87) PCT Pub. No.: WO2023/025411
PCT Pub. Date: Mar. 2, 2023

(65) Prior Publication Data
US 2024/0348427 A1   Oct. 17, 2024

(30) Foreign Application Priority Data

Aug. 23, 2021  (DE) .................. 10 2021 004 318.9
Jun. 23, 2022  (DE) .................. 10 2022 002 276.1

(51) Int. Cl.
*H04L 29/06* (2006.01)
*H04L 9/00* (2022.01)
(Continued)

(52) U.S. Cl.
CPC .......... *H04L 63/0876* (2013.01); *H04L 9/006* (2013.01); *H04L 9/0825* (2013.01)

(58) Field of Classification Search
CPC .................................................. H04L 63/0876
See application file for complete search history.

(56) References Cited

U.S. PATENT DOCUMENTS

2002/0157029 A1* 10/2002 French ................. G06Q 20/341
  726/21
2008/0130898 A1*  6/2008 Holtmanns ......... H04W 12/033
  380/278

(Continued)

FOREIGN PATENT DOCUMENTS

| EP | 3468130 A1 | 4/2019 |
| WO | 2019028698 A1 | 2/2019 |
| WO | 2019068731 A1 | 4/2019 |

OTHER PUBLICATIONS

3GPP, "3rd Generation Partnership Project; Technical Specification Group Services and System Aspects; Security architecture and procedures for 5G system (Release 17)", 3GPP TS 33.501 Verson 17.2.0, Jun. 25, 2021, pp. 1-257.
(Continued)

*Primary Examiner* — Bradley W Holder
(74) *Attorney, Agent, or Firm* — Workman Nydegger

(57) ABSTRACT

A method in a secure element, SE, for generating at least one symmetric key and/or one SE-specific cryptographic key pair for creating and transmitting a response to an identity query, including a GET IDENTITY command, transmitted by a network. The invention additionally relates to an SE, a computer program product and a system comprising an SE and a network.

15 Claims, 8 Drawing Sheets

(51) Int. Cl.
  *H04L 9/08*   (2006.01)
  *H04L 9/40*   (2022.01)

(56) References Cited

U.S. PATENT DOCUMENTS

2009/0198997 A1* 8/2009 Yeap ................. H04L 51/48
                                            380/282
2012/0311686 A1* 12/2012 Medina .............. H04L 63/0823
                                            726/7
2019/0268335 A1   8/2019 Targali

OTHER PUBLICATIONS

Khan, Haibat et al., "Identity Confidentiality in 5G Mobile Telephony Systems", Security Standardisation Research, Nov. 21, 2018, pp. 120-142, Lecture Notes in Computer Science, vol. 11322.
International Search Report from corresponding PCT Application No. PCT/EP2022/025382, Dec. 13, 2022.

\* cited by examiner

METHOD IN A SECURE ELEMENT

TECHNICAL FIELD OF THE INVENTION

The invention relates to various methods in a secure element, SE, preferably a fifth-generation subscriber identity module, a corresponding SE, a computer program product and a system comprising an SE and a network.

To use services, a terminal, for example a mobile telephone or a machine-to-machine device, M2M device for short, or a device for using Internet of Things technologies, IoT for short, contains an SE. The SE stores identity data (subscriber identity data, subscriber identifier, subscription) in order to uniquely identify and/or authenticate a subscriber (person or device) for the use of a service of a communication network or on a communication network. This allows an operator of the service or of the communication network to unambiguously assign the use of its offered service to each subscriber. Furthermore, it is possible for the operator of a communication network to enable network access, that is to say logging into the communication network, as soon as the subscriber has been authenticated. It may additionally deny network access if it is not possible to authenticate the subscriber.

TECHNICAL BACKGROUND

The world is mobile, and mobile networking is continuing to increase. Mobile communications-capable terminals communicate over mobile networks.

To use a mobile communications-capable terminal, such as a smartphone or mobile telephone, in a mobile network of a network operator, the terminal contains an SE that contains at least one subscription. By way of example, the subscription comprises a cryptographic authentication key, Ki, and unique identity data, such as an International Mobile Subscriber Identity, IMSI, or the Network Specific ID, NSI. The USIM application sets up, operates and disconnects connections of the terminal in the mobile network using the identity data.

In the standards for 2nd-generation to 4th-generation communication networks, the IMSI for logging the terminal into the communication network was queried by the network. In response thereto, the terminal or the SE transmits the IMSI in unencrypted form, that is to say in plain text, in a NAS message. This unencrypted IMSI constitutes a security problem, since what are known as IMSI catchers are able to intercept this IMSI in order to locate a position of the terminal.

To prevent IMSI catcher attacks, it has been defined, for the 5th-generation communication network, that all identity data for logging into the network must be transmitted in encrypted form, see for example ETSI TS 102 221 Version 15 or 3GPP TS 31.102 Version 15 or 3GPP TS 33.501 Version 15. In these 5G networks, the identity data (in particular IMSI, NSI) are referred to as a SUbscription Permanent Identifier, SUPI, and transmitted in the 5G network in encrypted form as a SUbscription Concealed Identifier, SUCI, see points 5.2.5 and 6.12 in 3GPP TS 33.501, Version 15.2.0.

For identification and authentication in the network, the network may make an identity query or, if applicable, a registration query. A registration query contains an identity query; its procedure is described in principle in 3GPP TS 23.501. An identity query must be answered within a short time frame, for example within 6 seconds. Within this time, the identity data have to be encrypted, in burdensome fashion, and transmitted to the network in response to the identity query.

Encrypting the SUPI to create a SUCI is computationally intensive and time-consuming, since provision is made for complex encryption algorithms, see for instance fig. C.3.2.1 of 3GPP TS 33.501, Version 15.2.0. It turned out that the time frame prescribed for this, even with regard to user-friendliness, is tight and is hardly able to be complied with, in particular by low-resource SEs. If the time frame is not complied with ("timeout"), the identity query is deemed not to have been answered, and a network login then cannot take place.

In one solution approach, higher-resource SEs are used, having for example a crypto-coprocessor or a multiplication accelerator. These SEs are expensive.

In order to comply with the prescribed time frame, WO 2019/068 731 A1 proposes to compute the SUCI in full beforehand and to store it in an SE. In response to a network identity query received as part of the regular use of the SE, a fully pre-computed SUCI is then loaded from the memory of the SE and used in a response to the identity query. However, such permanent storage of the SUCI is a security risk. It additionally presupposes that the parameters incorporated in the computing of the SUCI always remain unchanged. However, this is not always the case.

SUMMARY OF THE INVENTION

The invention is based on the object of providing a method in an SE in which the computing time taken to create and transmit a response to the network identity query is able to be shortened, without the encrypted identity data required for this purpose being permanently stored beforehand. In so doing, the intention is also to allow a response to one or more network identity queries to be created and transmitted multiple times in a shortened period. Another object of the invention is to adapt the execution steps that are carried out before an identity query and allow shortened creation and transmission of a response to the identity query to a degree of resource utilization of the SE, and thus not to block the execution of other functions, tasks or programs on the SE. High-resource SEs (with corresponding cryptoprocessor arithmetic or multiplication accelerators, for example Montgomery, etc.) are intended to be dispensed with for cost reasons.

According to the invention, provision is made for a method in a secure element, SE, for generating at least one symmetric key and/or one SE-specific cryptographic key pair for creating and transmitting the response to the identity query, in particular a GET IDENTITY command, transmitted by the network, comprising the following method steps: first step: generating, in the SE, at least one SE-specific cryptographic key pair on the basis of an ECC algorithm and storing the at least one SE-specific cryptographic key pair in a non-volatile memory; and/or second step: generating, in the SE, the at least one symmetric key using the stored private key part of the first SE-specific cryptographic key pair and a public key part of a network key pair in the SE and storing the symmetric key part in the non-volatile memory, wherein the first step and/or the second step are/is executed prior to receiving the identity query transmitted by the network, wherein the generated symmetric key is used to create and transmit the response to the identity query transmitted by the network, wherein the start of the execution of the second step takes place in temporally decoupled fashion after the execution of the first step.

Using this method, substeps of creating and transmitting the response to the network identity query are already executed before the identity query is received. The execution of the substeps results in partial computing results, which are used to create and transmit the response to the network identity query, being stored on the SE or the terminal. If a network identity query is received in the SE, only the last computing steps for creating and transmitting the response to the network identity query are computed, based on the stored partial computing results. These last computing steps may be executed in a short time and do not jeopardize a total time, to be fallen below, taken to transmit the response to the identity query.

This thus greatly reduces the computational complexity and therefore also the time required to create and transmit a response containing encrypted identity data when the network identity query is received.

As a result, it is possible to operate much simpler and therefore more cost-effective SEs in the 5G network, since a coprocessor for computing the SUCI is now no longer necessary in order to comply with the maximum time taken to respond to an identity query. By pre-computing keys, it is possible to comply with technical specifications according to 3GPP and ETSI, and the performance in terms of answering/processing an identity query is significantly increased.

Preferably, the SE-specific cryptographic key pair is generated by the SE before the identity query is received. The SE-specific cryptographic key pair comprises the private key part (for generating the symmetric key) and a public key part. The public key part is preferably part of the response to the identity query and is integrated into the response in the transmission step of creating and transmitting the response to the network identity query. The public key part may be the "Eph. Public Key of UE" according to fig. C.3.2-1 of 3GPP TS 33.501, Version 15.2.0.

This generation may correspond to the step "1. Eph. Key pair generation" according to fig. C.3.2-1 of 3GPP TS 33.501, Version 15.2.0, with the difference that this key pair was already generated before the network identity query was received. The generation may take place on the basis of an elliptic curve encryption, for example in accordance with an "Elliptic Curve Integrated Encryption Scheme, ECIES", for example in accordance with a Curve25519 algorithm according to RFC7748 or a secp256r1 algorithm according to the SEC-2 standard. By way of example, the ECIES parameters may be found in Appendix C3.4 of 3GPP TS 33.501, Version 15.2.0.

The generation of the SE-specific cryptographic key pair alone may take a certain amount of time in the SE, for example more than 1 second or more than 2 seconds or more than 3 seconds. Generating this SE-specific cryptographic key pair prior to receiving the identity query from the network makes it possible to shorten the time taken to create and transmit the response to the network identity query by the time taken to create the SE-specific cryptographic key pair, meaning that the network identity query is able to be answered in timely fashion.

The symmetric key is a key of a symmetric cryptosystem in which, unlike an asymmetric cryptosystem, both subscribers, here SE and the network, use the same key to encrypt and decrypt messages/data.

The generation of the symmetric key may correspond to the step "2. Key Agreement" according to fig. C.3.2-1 of TS 33.501 V 15.2.0, with the difference that this symmetric key is already generated before the identity query is received. The generation may take place on the basis of elliptic curve keys, for example in accordance with an "Elliptic Curve Integrated Encryption Scheme, ECIES", for example in accordance with a Curve25519 algorithm according to RFC7748 or a secp256r1 algorithm according to the SEC-2 standard. By way of example, the ECIES parameters may be found in Appendix C3.4 of 3GPP TS 33.501, Version 15.2.0.

The symmetric key may be generated using a public key part of a cryptographic key pair of the network. This public key part is made available beforehand to the SE and may be a public key part of a cryptographic key pair of a network provider. This public key part may be made available to the SE during personalization of the SE.

The symmetric key may have been generated using a private key part of an SE-specific cryptographic key pair.

The generation of the symmetric key alone may take a certain amount of time in the SE, for example more than 1 second or more than 2 seconds or more than 3 seconds. Generating this symmetric key prior to receiving the identity query from the network makes it possible to shorten the time taken to create and transmit the response to the network identity query by this time taken to create the symmetric key, meaning that the identity query is able to be answered in timely fashion.

Provision is made for either the generation of the symmetric key or the generation of the SE-specific cryptographic key pair, or the generation of the symmetric key and the generation of the SE-specific cryptographic key pair, to each already take place before the identity query is received by the SE from the network in the SE.

The generated symmetric key and/or the generated SE-specific cryptographic key pair is stored in a non-volatile memory area of the SE or of the terminal and loaded from the memory area of the SE when the method is executed. The memory area is a memory area of a non-volatile memory, and the memory area preferably stores objects that are "high update objects"—HUO for short. The keys generated according to the invention are also regarded as HUO data objects, and will then also be stored in the special NVM memory area. A maximum number of write-read access operations for storing and reading the keys generated according to the invention may thus be significantly increased.

The time of generation of the symmetric key and/or generation of the SE-specific cryptographic key pair may be immediately before the reception of the network identity query.

The time of generation of the symmetric key and/or generation of the SE-specific cryptographic key pair may be immediately before or after the transmission of a registration request by the network.

The time of generation of the symmetric key and/or generation of the SE-specific cryptographic key pair may be far in advance of the reception of the network identity query.

The symmetric key and/or the SE-specific cryptographic key pair may have been generated in the SE in response to a STATUS command or in response to a SELECT command.

The generation of the SE-specific cryptographic key pair in the SE and/or the generation of the symmetric key may take place before a registration request is transmitted to the network.

The generation of the SE-specific cryptographic key pairs and of the symmetric key may take place in a manner temporally decoupled from one another.

Temporally decoupled is understood to mean that it is not necessary to start generating an associated symmetric key part immediately after generating an SE-specific cryptographic key pair and/or to start generating a further SE-specific cryptographic key pair immediately after generating a symmetric key part. Thus, depending on the degree of resource utilization of the SE and thus on the current number and complexity of tasks or programs executed on the SE, the generation of the SE-specific cryptographic key pair and the generation of the symmetric key part or the generation of the symmetric key and of a further SE-specific cryptographic key pair may be temporally interrupted. The duration of this temporal interruption may be as long or as short as desired.

The task is a self-contained task that is represented by part of the program or an entire program. A task may also be a process or a task for an operating system, and thus a thread, (kernel) thread or user thread.

Preferably, the first step and/or the second step are/is executed at least twice before the identity query transmitted by the network is received in the SE.

Therefore, multiple SE-specific cryptographic key pairs and/or symmetric keys may be stored in a permanent or non-volatile memory on the SE or the terminal. Preferably, the first step and/or the second step are/is executed 10 times before the SE receives an identity query from the network.

This allows the SE or the terminal to be able to create and transmit a response in succession and/or temporally to multiple requests a GET IDENTITY command in a shortened time. Preferably, the network registers whether the creation and transmission of a response to a GET IDENTITY command has exceeded a maximum period of time and, if necessary, transmits another registration request to the SE. Based on the SE-specific cryptographic key pairs and/or symmetric keys stored in the non-volatile memory, the SE or the terminal is able to create and transmit another response to the GET IDENTITY command immediately, in a shortened time. The maximum period of time is preferably the maximum time permitted by the network to receive an identity response to the identity query. Preferably, the time taken to transmit the identity query from the network to the terminal or to the SE and the identity response from the terminal or from the SE to the network is also taken into account when determining the maximum time.

Preferably, the execution of the first step and/or of the second step may be at least temporarily paused and/or aborted if at least one further task is executed on the SE.

Pausing is understood to mean a time-limited interruption of a process. In this case, the process is that of executing the first and/or the second step. Therefore, the first step and/or the second step may be interrupted for a limited time if at least one further task is executed on the SE. The pause here may last as long or as short as desired.

This means that further tasks, which have to be executed on the SE for example, are not blocked by the execution of the first step and/or second step. This is especially advantageous if at least one symmetric key and/or one SE-specific cryptographic key pair is already present in the non-volatile memory. This is because the symmetric key already present in the non-volatile memory makes it possible to save computing time when creating and transmitting a response to the network identity query.

It is preferably determined, depending on a prioritization, whether the first step and/or the second step is executed and/or paused and/or aborted in order to execute at least one other task.

The prioritization determines a priority in line with which the first step and/or the second step are executed on the SE compared to other tasks or programs. The higher the selected priority of the first step and/or the second step, the more preference is given to executing the first step and/or the second step over executing other tasks or programs.

The priority of the first step and/or of the second step compared to at least one other task or program on the SE may depend on the number of SE-specific cryptographic key pairs already stored in the non-volatile memory and/or on the number of symmetric keys already stored in the non-volatile memory.

Preferably, the prioritization of the first step and/or of the second step compared to at least one other task or program on the SE is selected such that the priority becomes lower compared to other tasks or programs executed by the SE the more SE-specific cryptographic key pairs and/or symmetric keys have already been stored on the SE in a non-volatile memory, for example SSD, EPROM or flash memory. As an alternative, the priority may however also be selected to be the same from and/or up to a number of already generated symmetric keys.

This makes it possible to store the first symmetric key and/or the first SE-specific cryptographic key pair in the non-volatile memory very quickly. This increases the probability, upon the first network identity query, of at least one symmetric key and/or at least one first SE-specific cryptographic key pair for creating and transmitting the response to the identity query already having been stored in the non-volatile memory of the SE. The further generation of symmetric keys and/or SE-specific cryptographic key pairs may be carried out with lower priority. However, multiple high-priority symmetric keys and/or SE-specific cryptographic key pairs may also be generated. By way of example, the priority depends on how many registration requests and/or how many identity queries the network makes to the terminal or the SE and/or are expected from the network.

Preferably, the SE performs a method for creating and transmitting a response to an identity query, in particular a GET IDENTITY command, transmitted by a network, comprising the following method steps: receiving, in the SE, the identity query transmitted by the network; checking whether at least one valid symmetric key or at least one valid public key part of a network key pair is present in the non-volatile memory; generating the symmetric key by executing a second step if, in the checking step, no valid symmetric key but at least one valid public key part of a network key pair is present in the non-volatile memory, wherein the second step comprises generating, in the SE, the at least one symmetric key using a stored private key part of the first SE-specific cryptographic key pair and a public key part of a network key pair in the SE; or generating the symmetric key by executing a first step and the second step in the SE if, in the checking step, no valid symmetric key and no valid public key part of a network key pair is present in the non-volatile memory, wherein the first step comprises generating, in the SE, the at least one SE-specific cryptographic key pair on the basis of an ECC algorithm; the SE encrypting identity data stored on the SE, so as to generate encrypted identity data using the symmetric key generated in one of the previous generation steps, or a symmetric key that is present in the non-volatile memory; the SE applying a message authentication code, MAC, algorithm to the generated encrypted identity data so as to obtain a MAC; and transmitting a response to the identity query from the SE to the network, wherein the response contains the public key part of the SE-specific cryptographic key pair, whose private key part of the SE-specific cryptographic key pair was used to create the symmetric key, which in turn was used to create the response, the encrypted identity data, and the MAC.

In the checking step, the SE checks whether system conditions have changed in such a way that the SE-specific cryptographic key pair and/or the symmetric key are/is no longer valid.

By way of example, the public key part of the cryptographic key pair of the network, used to generate the symmetric key, may have changed in the meantime, which would make the symmetric key invalid and mean having to compute it again. Or, it is possible that the ECC algorithm for generating the SE-specific cryptographic key pair in the first step is no longer valid, because for example the ECC algorithm has changed, meaning that new key pairs and thus new symmetric keys have to be computed.

Changing only the public key part of a network key pair without changing the algorithm simply requires performing the second step in order to recompute the symmetric keys, since the cryptographic key pairs continue to remain valid.

The symmetric key generated beforehand would thus be invalid from the time of the change/update of the public key part of the cryptographic key pair of the network and/or a changed encryption in the first and/or second step. A response to the network identity query generated with this invalid key would therefore likewise be invalid, since the response cannot be decrypted and the login to the network would fail.

The checking step prevents this error. If it is identified that the public key part of the cryptographic key pair of the network or the algorithm for generating the SE-specific cryptographic key pair have changed compared to the last time a symmetric key was generated, the method for generating the response is executed on the identity query based on the second step and/or the first step and the second step.

If no valid public key part of the cryptographic key pair and thus no valid symmetric key is present, it is possible to generate a new symmetric key by executing only the second step by way of a valid private part of the SE-specific cryptographic key pair, and a current valid public key part of the cryptographic key pair of the network. This saves at least the time taken to execute the first step. In this generation step, the symmetric key may also be stored in a volatile memory, for example in the RAM.

If there is no valid private part of the SE-specific cryptographic key pair in the non-volatile memory, the execution of the first step and of the second step first generates an SE-specific cryptographic key pair and then, building on this, generates a symmetric key using a valid public key part of a cryptographic key pair. The SE-specific cryptographic key pair and/or the symmetric key may also be stored in the volatile memory, for example in the RAM, in this generation step. This ensures that, if no symmetric key and no valid SE-specific cryptographic key pair are stored in the non-volatile memory, only then are they recreated in response to an identity query. Otherwise, it is possible to achieve a shorter computing time. This generation step also allows a valid key always to be present, so that the response to the network identity query does not become invalid because a response cannot be decrypted and the login to the network thus fails.

The encryption step may correspond to the step "4. Symmetric Encryption" according to fig. C.3.2-1 of TS 33.501 V 15.2.0, with the difference that this symmetric key is already generated before the identity query is received. The result of the encryption step is for example the "ciphertext value" according to fig. C.3.2-1 of 3GPP TS 33.501, Version 15.2.0.

As input parameters for this encryption step, the identity data may be loaded from a memory of the SE. These identity data are unencrypted. By way of example, in a 5G network, the identity data are referred to as SUPI. The SUPI contains the IMSI or the NSI, which is used for identification in the 5G network. The (unencrypted) identity data constitute the data to be encrypted and consist at least of parts of the IMSI. The (unencrypted) identity data may correspond to the "plain text block" according to fig. C.3.2-1 of 3GPP TS 33.501, Version 15.2.0.

The unencrypted identity data may be stored in at least one file of the SE, wherein preference is given to at least one file, the file $EF_{IMSI}$ or $EF_{NSI}$, which contains an international mobile subscriber identifier, IMSI/NSI, wherein the response to the identity query preferably comprises a Subscription Concealed Identifier, SUCI.

The application step may correspond to the step "5. MAC Function" according to fig. C.3.2-1 of the TS 33.501 V 15.2.0 standard. A message authentication code, MAC for short, is used to obtain assurance about the origin of the identity data and to check the integrity thereof. The MAC is generated via the encrypted data in line with the standard. The receiver, that is to say the network, uses the MAC to check the symmetric key generated in the network, by virtue of the network recomputing the MAC with the generated symmetric key and comparing it with the received MAC. The MAC algorithm requires the result of the encryption step and a secret key, for example the "Eph. Mac Key" according to fig. C.3.2-1 of TS 33.501 V 15.2.0, as input parameters and computes from both of them a checksum, the received MAC, for example the "MAC tag value" according to fig. C.3.2-1 of 3GPP TS 33.501, Version 15.2.0.

The symmetric key may even be split before being used in the encryption step, for example into a first subkey that is used in the encryption step to generate the encrypted identity data and into a second subkey that is used in the application step to generate the MAC. This splitting may correspond to the step "3. Key derivation" according to fig. C.3.2-1 of 3GPP TS 33.501, Version 15.2.0. The first subkey may be the "Eph. enc Key, ICB" according to fig. C.3.2-1 of 3GPP TS 33.501, Version 15.2.0. The second subkey may be the "Eph. mac Key" according to fig. C.3.2-1 of 3GPP TS 33.501, Version 15.2.0. A key length may be adjusted during this splitting.

The SE then no longer needs to have an encryption coprocessor or a multiplication accelerator. This type of SE requires a particularly large time frame, for example more than 2 seconds or more than 3 seconds or more than 4 seconds or more than 5 seconds, to create and transmit a response according to the conventional method. Generating the symmetric key beforehand and/or generating the SE-specific cryptographic key pair beforehand makes it possible to significantly reduce this time frame, and thus prevent network rejections due to taking too much time to transmit a response to an identity query.

Preferably, the network recognizes whether the creation and transmission of the response to the identity query transmitted by the network exceeds a maximum time or identifies that the identity query has not already been accepted by the network. In this case, the network transmits another registration request to the SE, and the SE responds to receiving an identity query transmitted by the network by creating and transmitting another response according to the method described above.

Preferably, the network registers that the creation and transmission of a response to a GET IDENTITY command has exceeded a maximum period of time and transmits another registration request to the SE. Based on the SE-specific cryptographic key pairs and/or the symmetric key stored in the non-volatile memory, the SE and/or the terminal are/is able to generate and transmit another response to the GET IDENTITY command immediately, in a shortened time. If the SE does not have another valid symmetric key, the execution of the first and/or second step is preferably started immediately after the transmission of the new registration request.

The maximum period of time is preferably the maximum time permitted by the network to receive an identity response to the identity query. Preferably, the time taken to transmit the identity query from the network to the terminal or to the SE and the time taken to transmit the identity response from the terminal or from the SE to the network is also taken into account when determining the maximum time.

This makes it possible, in the event of a relatively long time taken to create and transmit the response to the network identity query, for example due to a poor modem, poor reception or due to higher-priority tasks on the SE, to make a new identity query immediately without having to wait for a network error message.

Expediently, the symmetric key and/or the public part and/or the private part of the SE-specific cryptographic key pair is deleted after at least one of these keys has been used to create and transmit the response to the identity query transmitted by the network.

By way of example, the symmetric key and/or the SE-specific cryptographic key pair is deleted after the keys have been used to create and transmit a response. By way of example, it is also possible to delete the private part of the SE-specific cryptographic key pair after it has been used to create a symmetric key. As an alternative to deletion, the keys may also for example be marked as already used and remain in the non-volatile memory for a further check, for example.

Preferably, a new symmetric key and/or a new SE-specific cryptographic key pair is created and stored in the non-volatile memory only when a maximum number of symmetric keys and/or SE-specific cryptographic key pairs in the non-volatile memory has not yet been exceeded and/or a memory space requirement for the symmetric keys and/or the SE-specific cryptographic key pairs does not yet exceed a predefined memory space in the non-volatile memory.

This ensures that the number of stored symmetric keys and/or the number of stored SE-specific cryptographic key pairs is limited and for example does not exceed the predefined memory space. It is also possible to specify what predefined memory space is allowed to be taken up in the non-volatile memory by the symmetric keys and/or the SE-specific cryptographic key pairs.

Preferably, the maximum number of symmetric keys to be generated and/or SE-specific cryptographic key pairs is defined upon initialization and/or activation of the SEs or of the terminal, and/or the predefined memory space is reserved in the non-volatile memory upon initialization and/or activation.

This means that, upon initialization and/or activation of the SEs or of the terminal, it is possible to change or define the size of the predefined memory space that is reserved for storing the symmetric keys and/or the SE-specific cryptographic key pairs, in order to adapt the SE and/or the terminal to new conditions, such as new networks for example.

Preferably, the SE does not have an encryption coprocessor and/or multiplication accelerator in order to save costs when manufacturing the terminal or in the SE that is used.

Preferably, the first step and/or the second step are executed at least once in the SE following reception of a STATUS command or a SELECT command.

It is thereby possible for example for the user in the SE, the network in the SE or the terminal in the SE to be able to trigger the execution of the first and/or the second step, in order to adapt the execution upon the user's request, through requests from the network or based on internal processes on the terminal.

In a further aspect of the invention, provision is made for a secure element, preferably a fifth-generation subscriber identity module. The SE has: an interface configured to receive an identity query, in particular a GET IDENTITY command, transmitted by a network; a non-volatile memory configured to store identity data, preferably in at least one file; and a control unit configured to execute at least one of the method steps described above.

The SE may furthermore comprise an operating system, stored executably in the non-volatile memory and configured, when it is executed in the control unit, to perform the method steps of the methods described above.

In a further aspect, a computer program product is installed executably in an SE, preferably a fifth-generation subscriber identity module, and has means for executing the method steps of the methods described above.

In a further aspect, provision is made for a system comprising an SE, preferably a fifth-generation subscriber identity module, and a network, wherein the system is configured to execute the method steps of the methods described above.

An SE, within the meaning of the invention, is an electronic module of reduced size and resource capabilities, having a control unit (microcontroller).

The term "SE" is synonymous with the term "UICC", "eUICC", "subscriber identity module", "chip card", "iUICC", "integrated eUICC", "integrated secure element", "embedded secure element", "secure element", or "SIM". The SE is for example a chip card or a SIM card or a subscriber identity module. The SE serves to use the machine-readable identity data stored in the secure non-volatile memory area to identify a subscriber in a communication network and to authenticate them for the use of services. SE also encompasses USIM, TSIM, ISIM, CSIM or R-UIM. By way of example, an SE is thus defined as a USIM application in ETSI TS 131 102. By way of example, an SE is thus defined as a SIM application in ETSI TS 151 011. By way of example, an SE is thus defined as a TSIM application according to ETSI TS 100 812. By way of example, an SE is thus defined as an ISIM application according to ETSI TS 131 103. By way of example, an SE is thus defined as a CSIM application according to 3GPP2 C.S0065-B. By way of example, an SE is thus defined as an R-UIM application according to 3GPP2 C.S0023-D.

The SE may be an integral component within the terminal, for example a hard-wired electronic module. Such SEs are also referred to as eUICCs. In this design, these SEs are not intended to be removed from the terminal, and cannot be easily replaced in principle. Such SEs may also be designed as embedded secure elements, and are a secure hardware component in the device.

The SE may also be a software component in a trusted part of an operating system, what is known as a trusted execution environment, TEE for short, of the terminal. By way of example, the SE is formed within a secure runtime environment in the form of programs running therein, what are known as "trustlets" or "trusted applications".

The SE may also be an integral part of a larger integrated circuit, for example of a modem or application processor. Such SEs are referred to as "integrated UICC", "integrated TRE", "integrated eUICC" or "integrated SE". Such SEs are fixedly integrated into an SoC as an integrated processor block and are able to be connected via a bus internal to the chip. The SE has for example an internal or external secure non-volatile memory area in which the identity data are securely introduced in order to prevent tampering and/or misuse attempts during identification and/or authentication on the network.

In one embodiment, the SE may be operable by way of a terminal, wherein the SE, in this embodiment, is autonomous except for supply signals, such as supply voltage, clock cycle, reset, etc. The SE may then have an interface (data interface) for communication with the terminal, into which the SE is inserted, possibly ready for operation. This communication preferably takes place via a connection protocol, in particular a protocol according to the ETSI TS 102 221 or ISO-7816 standard.

The term "terminal" is preferably used here, since the terminal may primarily be a "terminal" in communication technology. This does not rule out the "terminal" possibly being a "device" in another technology. The terms "terminal" and "device" are used synonymously here.

The SE may be used for remote monitoring, inspection and maintenance of devices such as machines, installations and systems. It may be used for metering units such as electricity meters, hot water meters, etc. The SE for example forms part of IoT technology.

A terminal, within the meaning of the invention, is in principle a device or a device component having means for communication with a communication network in order to be able to use services of the communication network or to be able to use services of a server via a gateway of the communication network. By way of example, the term encompasses a mobile device such as a smartphone, a tablet PC, a notebook or a PDA. By way of example, the terminal may also be understood to mean multimedia devices such as digital picture frames, audio devices, televisions or e-book readers, which likewise have means for communication with the communication network.

In particular, the terminal is installed in a machine, an automaton and/or a vehicle. If the terminal is installed in a motor vehicle, it has an SE integrated therein, for example. The SE may set up a data connection to a server via the communication network by way of the terminal, for example a modem of the terminal. By way of example, the terminal may be used to contact a server of the terminal manufacturer in order to address control units, for example ECUs (ECU=electronic control unit) for functionalities of the terminal. The UICC may be used to contact a server in the background system of the mobile network operator, MNO, for example a server for loading updates for software, firmware or/and the operating system of the SE into the SE.

In addition to the smartphones and mobile telephones, mobile communications-capable terminals also include regulation devices (control devices or measuring devices or combined control/measuring devices) for industrial facilities in the commercial or private sphere. Industrial facilities are for example production installations that have one or more regulation devices (terminals) that are able to communicate with a background system or/and with one another via a mobile network. Other industrial facilities include smart home facilities such as heaters or power consumers having terminals in the form of regulation devices.

By way of example, a command may be an instruction, or an order transmitted by the device. The command is preferably a command according to the ETSI TS 102 221 or ISO/IEC 7816 standard. In one preferred embodiment, commands in the form of APDU commands are received in the UICC. An APDU is a combined command/data block of a connection protocol between the UICC and the device. The structure of the APDU is defined by the ISO-7816-4 standard. APDUs constitute an information element on the application layer (layer 7 of the OSI layer model).

The SE is preferably a fifth-generation USIM, also referred to as "5G USIM". A subscriber may thus be identified according to the 5G standard.

In a further preferred embodiment, the at least one file is the EFMSI, which includes an international mobile subscriber identity, IMSI. It is important to protect this IMSI, and—if possible—it should not be transmitted to the terminal or in the network in plain text. In a 5G network, the IMSI is not exchanged between the SE and the communication network in plain text.

In a further preferred embodiment, the at least one file is the file $EF_{NSI}$, which includes a permanent subscriber identifier, or "Subscription Permanent Identifier", SUPI for short. It is important to protect this SUPI, and—if possible— it should not be transmitted to the terminal or in the network in plain text. This SUPI in the $EF_{NSI}$ is preferably not the IMSI. This SUPI may be a Network Access Identifier, NAI for short, as defined in the 3GPP TS 23.003 standard.

In a further preferred embodiment, the at least one file is the file $EF_{Routing\ Identicator}$, which includes a routing indicator for computing the SUCI. Using this parameter, a terminal or the SE is able to perform the method according to the invention and, as a result, create a SUCI and transmit it to the network. This file $EF_{Routing\ Identicator}$ contains the routing indicator, which, together with an MCC and an MNC, makes it possible to forward network signalling containing SUCI to AUSF and UDM instances that are able to serve the subscriber, as defined in the 3GPP TS 23.003 standard.

By way of example, a Subscription Permanent Identifier, SUPI for short, is used as identity data in the 5G network. The SUPI is defined in the 3GPP specification TS 23.501. A valid SUPI may in this case be an IMSI or a Network Access Identifier, NAI for short, as defined in RFC 4282 in conjunction with 3GPP TS 23.003. The SUPI may then be converted into a Subscription Concealed Identifier, SUCI for short (encrypted SUPI), using the 5G USIM. The SUCI is a privacy-protecting network identifier that contains the SUPI concealed therein. The 5G USIM generates a SUCI using the method described here and using this ECIES-based protection scheme set forth above with the previously generated symmetric key. The IMSI (which is part of the SUPI) is then sent in encrypted form as a SUCI in response to the network identity query.

In addition, identity data are for example data that uniquely authenticate a subscriber on the communication network, for example an authentication algorithm, specific algorithm parameters, a cryptographic authentication key Ki and/or a cryptographic over-the-air key, OTA for short, key. In addition, identity data are for example data that uniquely authenticate a subscriber to a service, for example a unique identifier or signature. A service is in particular a voice service or a data service of a server by way of which information and/or data are transmitted over the communication network.

A communication network (the network) is a technical facility on which signals are transmitted so as to identify and/or authenticate the subscriber. The communication network provides its own services (its own voice and data services) and/or allows the use of services from external instances. The communication network is preferably a mobile network. Device-to-device communication under the supervision of the communication network is possible here. In particular a 5th-generation "5G" mobile network is understood here to be a communication network.

DETAILED DESCRIPTION OF EXEMPLARY EMBODIMENTS

The invention and further embodiments and advantages of the invention are explained in more detail below with reference to figures, wherein the figures merely describe exemplary embodiments of the invention. The same components in the figures are provided with the same reference signs. The figures should not be considered to be true to scale; individual elements of the figures may be illustrated so as to be overly large or overly simplified.

DETAILED DESCRIPTION OF VARIOUS EMBODIMENTS

Figure 1:
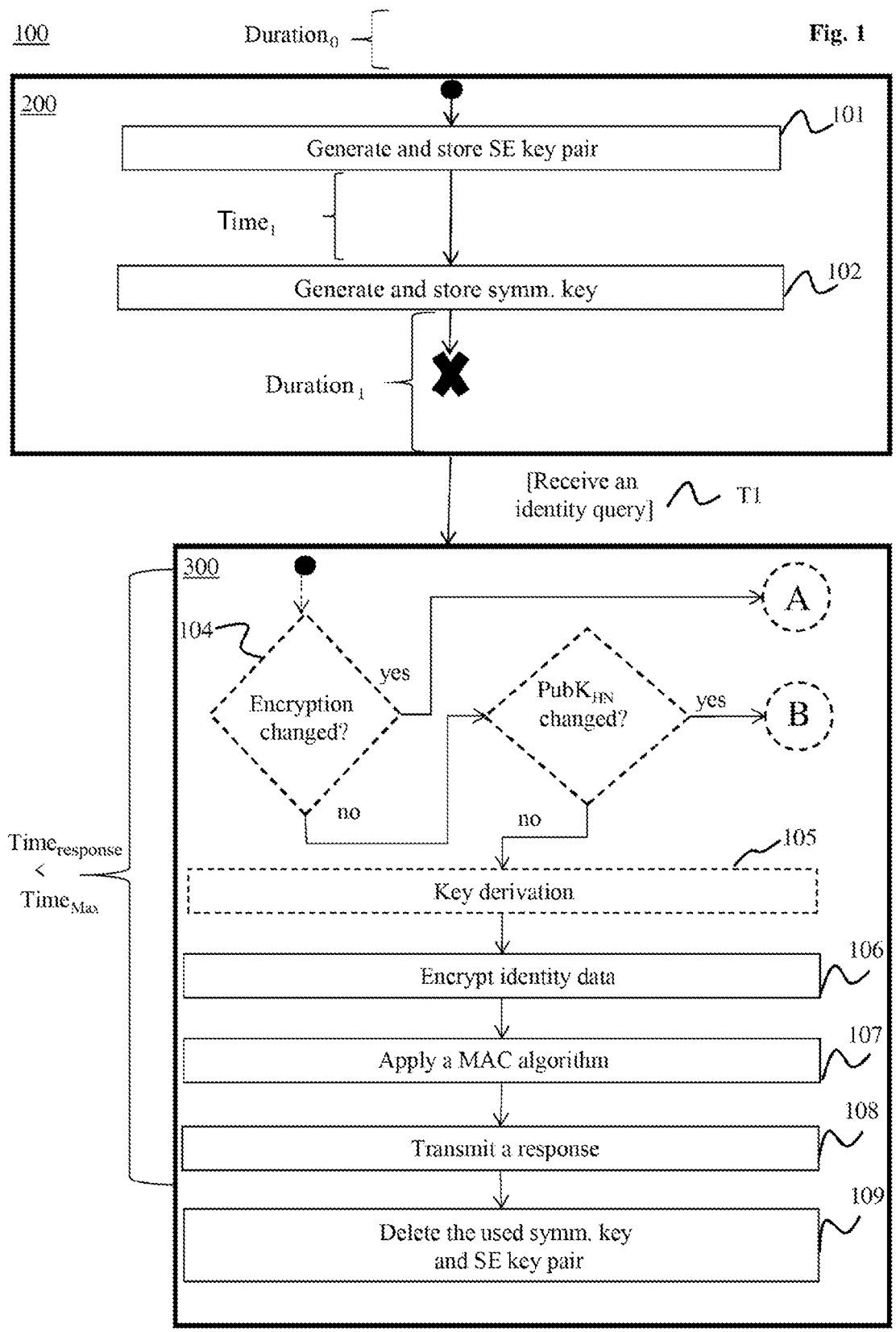
FIG. 1 shows a flowchart of a method according to the invention in an SE.
Figure 2:
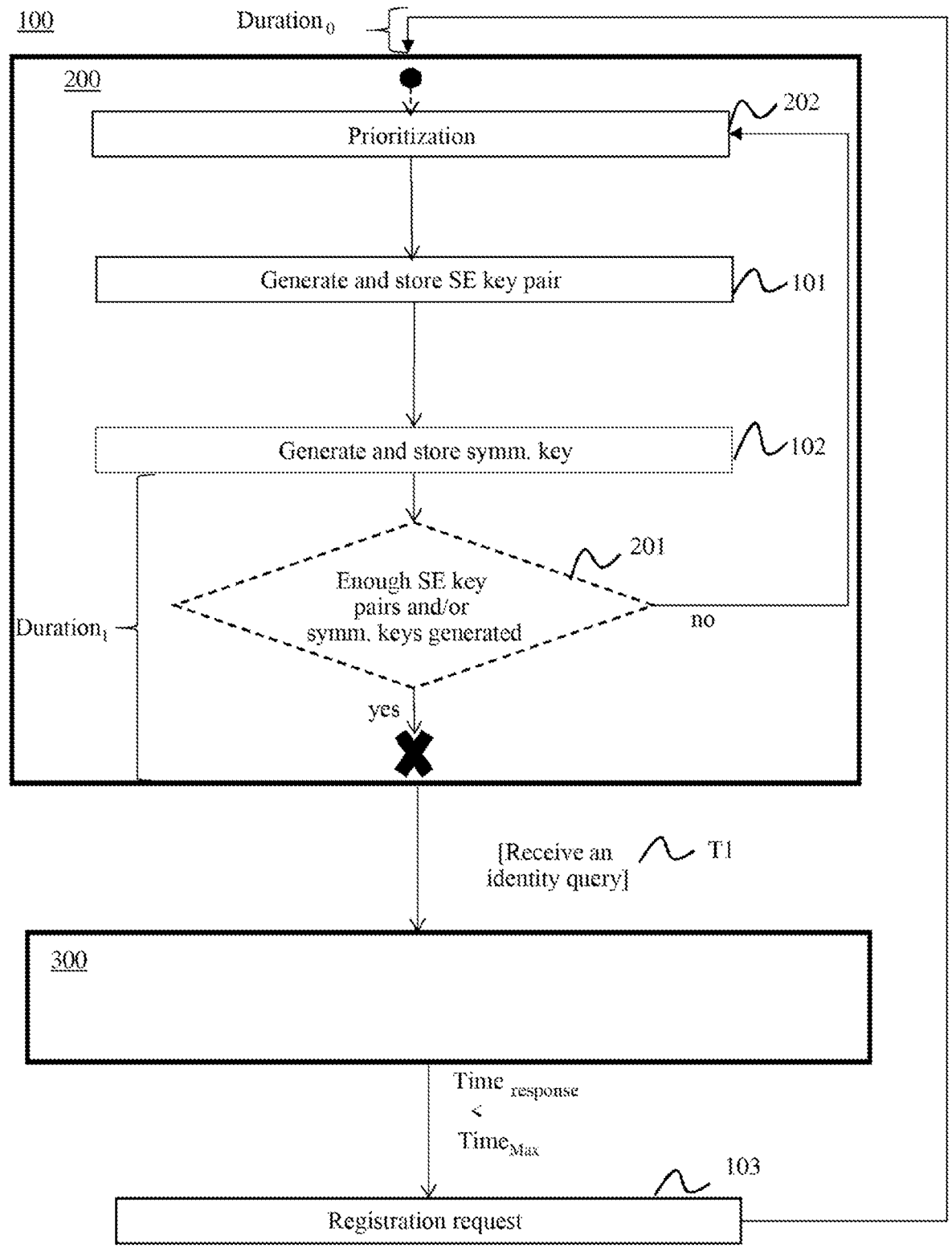
FIG. 2 shows a flowchart of a method according to the invention in an SE.
Figure 3:
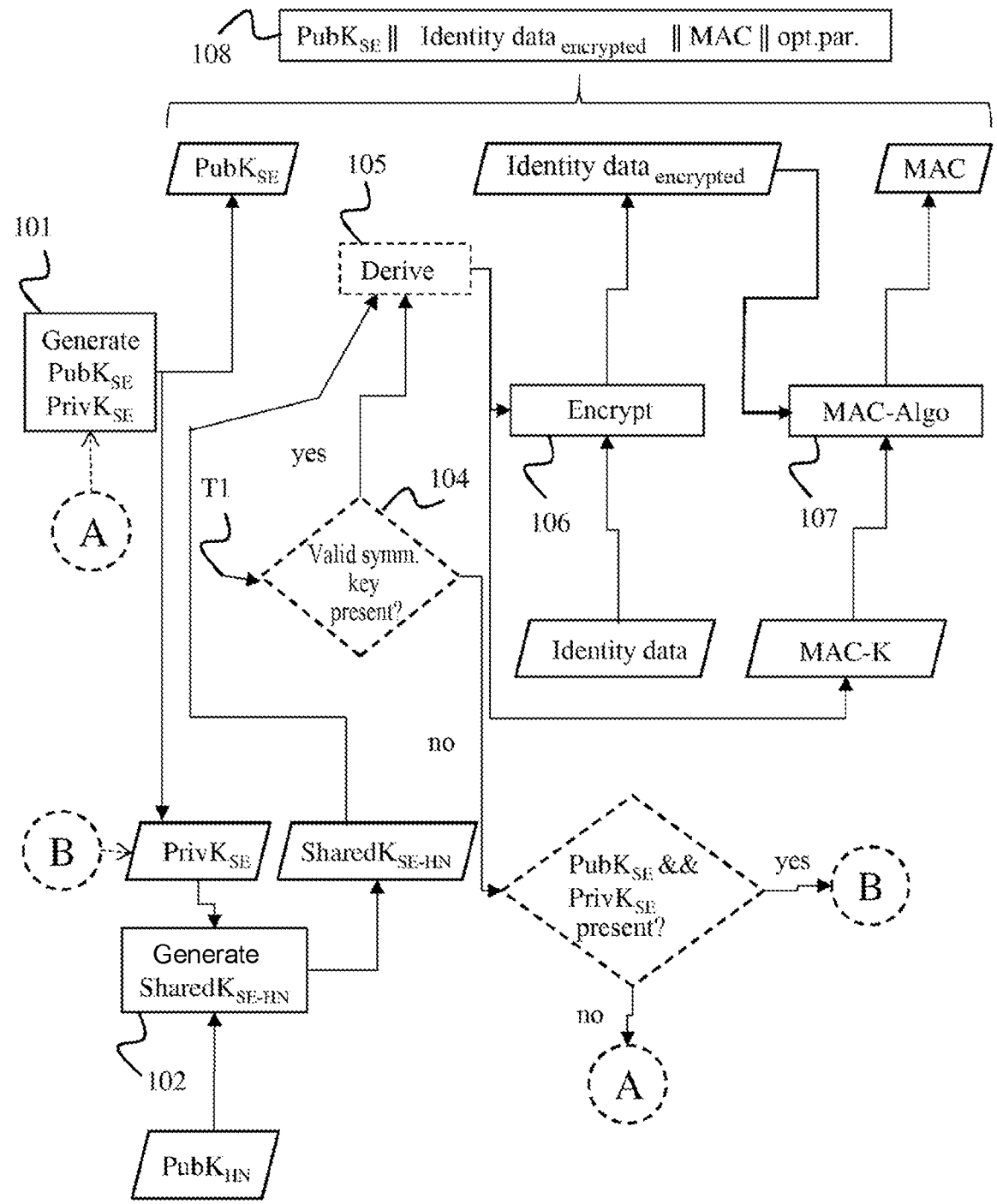
FIG. 3 shows a flowchart of a method according to the invention in an SE.

FIGS. 1, 2 and 3 each show, with reference to a flowchart, one exemplary embodiment of a method 100 according to the invention comprising the steps of creating and storing 200 the keys temporally before the reception of an identity query or a registration request containing an identity query and the creation and transmission 300 of a response to the network identity query in an SE. FIGS. 1, 2 and 3 are described together below.

Detailed Description of Various Embodiments

A first step 101 and a second step 102 are part of a routine for creating and storing 200 the keys before the reception of a network identity query.

In the first step 101 (shown in FIGS. 1 and 2, not in FIG. 3), an SE-specific cryptographic key pair $PubK_{SE}$, $PrivK_{SE}$ is generated in the SE on the basis of an ECC algorithm. The SE-specific cryptographic key pair $PubK_{SE}$, $PrivK_{SE}$ depends on the type of encryption that is to be used. The type of encryption is defined by the network. The type of encryption may change in principle. By way of example, to ensure that the SE uses the same type of encryption as the network, the network transmits to the SE a configuration file that contains information about the cryptographic encryption to be applied. Execution of a configuration file is described for example in the simalliance specification "eUICC Profile Package: Interoperable Format", Version 2.3.1, November 2019, Annex D.

The configuration file is read by the SE at certain points in time, for instance when it is powered up; expediently, it is always read whenever the SE receives a GET IDENTITY command.

By way of example, a Curve25519/X25519 algorithm is used as encryption method. An ECIES profile parameter used in Appendix C3.4 of the 3GG TS 33.501 standard may be used. The encryption method may be of ECIES Profile A or ECIES Profile B type.

Before the first step 101 is performed, the encryption method to be applied is ascertained, for example by reading the configuration file. The defined encryption method is used to compute the SE-specific cryptographic key pair $PubK_{SE}$, $PrivK_{SE}$.

As a result of the first step 101, a private key part $PrivK_{SE}$ of the SE-specific cryptographic key pair is generated. This step may correspond to the first step "1. Eph key pair generation" of the method according to fig. C.3.2-1 of TS 33.501 V 15.2.0.

In an SE without a crypto-coprocessor or without a multiplication accelerator, this first step 101 may take up to 3 seconds.

In the following second step 102 (shown in FIGS. 1 and 2, not in FIG. 3), a symmetric key $SharedK_{SE-HN}$ is generated in the SE. This symmetric key $SharedK_{SE-HN}$ is generated using the private key part $PrivK_{SE}$, generated in the first step 101, of the SE-specific cryptographic key pair and a public key part $PubK_{HN}$ of a cryptographic key pair of a network.

The public key part $PubK_{HN}$ is known to the SE before the second step 102 is executed and is present in the SE. Like the encryption method, the public key part $PubK_{HN}$ may change. By way of example, the network may have notified the SE via OTA of a new, current public key part $PubK_{HN}$.

The public key part $PubK_{HN}$ is expediently contained in the configuration file. An initial public key part $PubK_{HN}$ may already be stored in the memory of the SE when the SE is personalized.

Before executing the second step 102, the SE checks whether the last-used public key part $PubK_{HN}$ matches the current public key part $PubK_{HN}$. If it does, the SE uses the stored public key part $PubK_{HN}$, and otherwise it updates the stored public key part $PubK_{HN}$ with the current stored public key part $PubK_{HN}$ and then uses it.

The second step 102 may correspond to the step "2. Key agreement" of the method according to fig. C.3.2-1 of TS 33.501 V 15.2.0. In an SE without a crypto-coprocessor or without a multiplication accelerator, this step may take up to 3 seconds.

The first step 101 and the second step 102 may be executed in a manner temporally decoupled from one another. Therefore, a time $time_1$ may elapse between the execution of the first step 101 and of the second step 102 on the SE. The time $time_1$ between the execution of the first step 101 and of the second step 102 may be defined by a prioritization of the execution of the first step 101 and of the second step 102 on the SE compared to other tasks that are executed on the SE. It is also possible for the first step 101 to be executed not immediately, but only after a time $duration_0$ has elapsed following starting, activation and/or initialization of the SE. It is likewise possible for a longer time $duration_1$ to elapse between the completion of the execution of the first step 101 and/or of the second step 102 until the SE receives a network identity query.

It is also possible for the execution of the first step 101 or of the second step 102 to be aborted upon receipt of an identity query (shown in FIGS. 1 and 2, not in FIG. 3), so that the SE is able to begin creating and transmitting 300 a response to the network identity query. This preferably takes place only if at least one valid symmetric key is present in the non-volatile memory.

It is also possible to execute the first step 101 and/or the second step 102 multiple times (shown in FIG. 2, not in FIGS. 1 and 3). Accordingly, multiple SE-specific cryptographic key pairs $PubK_{SE}$, $PrivK_{SE}$ and/or symmetric keys $SharedK_{SE-HNv}$ may be stored in the non-volatile memory. The prioritization 202 may be redefined before each execution of the first step 101. The first step 101 and/or the second step 102 are/is executed as often as necessary until enough SE-specific cryptographic key pairs $PubK_{SE}$, $PrivK_{SE}$ and/or symmetric keys $SharedK_{SE-HNv}$ are stored in the non-volatile memory. This is checked in step 201.

A routine for creating and transmitting 300 a response to an identity query will be described below.

In step 104 (shown in FIG. 1 and FIG. 3, not in FIG. 2), it is checked whether a valid symmetric key $SharedK_{SE-HN}$ is present in the non-volatile memory. To this end, it is checked whether the cryptographic computing method that was used to determine the SE-specific cryptographic key pair $PubK_{SE}$, $PrivK_{SE}$ present in the non-volatile memory 17 has changed in the meantime. This may be the case for example if the type of encryption or parameters of the encryption have changed.

Expediently, constraints managed via the network are stored in a configuration file that is managed on the SE and is likewise stored in the non-volatile memory 17. Execution of a configuration file is described for example in the simalliance specification "eUICC Profile Package: Interoperable Format", Version 2.3.1, November 2019, Annex D. The configuration file expediently indicates at least the currently applicable cryptographic computing method and contains the current public key part $PubK_{HN}$. The configuration file is always kept up-to-date and may be updated by the network at any time.

To check the cryptographic key pair $PubK_{SE}$, $PrivK_{SE}$, the SE expediently reads the configuration file. The SE compares the entry that is read for the cryptographic computing method to be applied with the computing method that was used to compute the individual cryptographic key pair $PubK_{SE}$, $PrivK_{SE}$ located in the non-volatile memory 17. A mismatch may occur for example if the type of encryption has been changed from ECIES Profile A type to ECIES Profile B.

If the computing method has changed, then the symmetric key $SharedK_{SE-HN}$ in the non-volatile memory 17 is no longer valid and a new SE-specific cryptographic key pair $PubK_{SE}$, $PrivK_{SE}$ has to be computed. To this end, as illustrated in FIG. 3, point "A" is proceeded from.

If it is identified, in the check 104, that the computing method has not changed,
  it is also checked whether the public key part $PubK_{HN}$ present in the non-volatile memory 17 for computing the is valid. To this end, it is checked whether the public key part $PubK_{HN}$ used in the second step 102 to compute the symmetric key $SharedK_{SE-HN}$ present in the non-volatile memory 17 has changed in the meantime, for example by update, parameter adjustment or replacement. To this end, the SE expediently compares the current public key part $PubK_{HN}$, able to be taken from the configuration file, with the public key part $PubK_{HN}$ that was used to compute the symmetric key $SharedK_{SE-HN}$ stored in the non-volatile memory 17. If this then results in a change, the SE stores the current public key part $PubK_{HN}$ contained in the configuration file as a new valid public key part $PubK_{HN}$ in the non-volatile memory 17.

If the computing method and the public key part $PubK_{HN}$ that is used have not changed, it is checked whether all stored symmetric keys $SharedK_{SE-HN}$ have already been used. If this is not the case, as illustrated in FIG. 3, point "B" is proceeded from.

If the public key part $PubK_{HN}$ that is used has changed in the meantime, the symmetric key $SharedK_{SE-HN}$ in the memory is no longer valid and has to be recomputed. However, since in this case the SE-specific cryptographic key pair $PubK_{SE}$, $PrivK_{SE}$ continues to remain valid, only that part of the key computation that is based on the provision of the SE-specific cryptographic private key $PrivK_{SE}$, that is to say only the second step 102, has to be executed. The current public key part $PubK_{HN}$ is used for the computation.

The first step 101 and the second step 102, which are executed from point "A", and the second step 102, which is executed from point "B", correspond to the first step 101 and the second step 102 of creating and storing 200 the keys before receiving a network identity query. The SE-specific cryptographic key pair $PubK_{SE}$, $PrivK_{SE}$ created in the first step 101 and/or the symmetric key $SharedK_{SE-HN}$ created in the second step 102 may also be stored in a volatile memory area 18, for example a RAM. K In optional step 105 (shown in FIG. 1 and FIG. 3 but not in FIG. 2), a first subkey and a second subkey are derived from the symmetric key $SharedK_{SE-HN}$. This step 105 may correspond to the step "3. Key derivation" according to fig. C.3.2-1 of 3GPP TS 33.501, Version 15.2.0. The first subkey may be the "Eph. enc Key, ICB" according to fig. C.3.2-1 of 3GPP TS 33.501, Version 15.2.0. The second subkey may be the "Eph. mac Key" according to fig. C.3.2-1 of 3GPP TS 33.501, Version 15.2.0. A key length may also be adjusted during this splitting 105.

In step 106 (shown in FIG. 1 and FIG. 3 but not in FIG. 2), identity data that are stored in the SE are encrypted. File contents of the file $EF_{IMSI}$ are used here as input data for the encryption 106. This encryption 106 may be the step "4. Symmetric Encryption" according to fig. C.3.2-1 of 3GPP TS 33.501, Version 15.2.0. As a result of this step, encrypted identity data are obtained. The encrypted identity data from step 106 are (also) sent to the network as part of a response to an identity query from the network.

In step 107 (shown in FIG. 1 and FIG. 3 but not in FIG. 2), a MAC algorithm is applied. The encrypted identity data from step 106 are used here as an input parameter for the MAC algorithm. In addition, the second subkey "Eph. mac Key" may be used as another input parameter for the MAC algorithm. This application 107 may be the step "5. MAC function" according to fig. C.3.2-1 of 3GPP TS 33.501, Version 15.2.0. As a result of this step 107, a MAC is obtained, which may also be in the form of "MAC-tag value" according to fig. C.3.2-1 of 3GPP TS 33.501, Version 15.2.0. The MAC from step 107 is (also) sent to the network as part of a response to an identity query from the network.

In step 108 (shown in FIG. 1 and FIG. 3 but not in FIG. 2), a response to the network identity query is transmitted. By way of example, the response comprises a concatenation of the public part $PubK_{SE}$ (step 101), the encrypted identity data (step 106) and the MAC (step 107). Additional parameters may likewise be contained in the response.

Response = $PubK_{SE}$ || Identity data$_{encrypted}$ || MAC || optional parameters The response 108 is preferably the result of the GET IDENTITY command.

In optional step 109 (shown in FIG. 1, but not in FIGS. 2 and 3), the SE-specific cryptographic key pair $PubK_{SE}$, $PrivK_{SE}$ that is used and/or the symmetric key $SharedK_{SE-HN}$ that is used for creating and transmitting 300 a response to the identity query are/is deleted from the non-volatile memory or marked as used, if the values have been stored in the non-volatile memory.

The routine for creating and transmitting 300 the response to a network identity query must not take longer than a maximum time. Otherwise, the network will no longer accept the response. If the routine for creating and transmitting 300 the response to the identity query takes longer than the maximum time, a new registration request 103 may be transmitted directly by the network to the SE (shown in FIG. 2 but not in FIGS. 1 and 3). It is then possible to start the redefinition of the prioritization 202 and the execution of the first step 101 and of the second step 102 immediately. Or, it is possible to start the execution of the first step 101 and of the second step 102 immediately in order to use the time between the registration request 103 and a network identity query or a transition T1, which includes the network identity query, which the terminal preferably forwards to the SE, to create new SE-specific cryptographic key pairs $PubK_{SE}$, $PrivK_{SE}$ and/or symmetric key $SharedK_{SE-HN}$.

In particular, the ETSI TS 102 221 standard, Version 15 and higher, and the 3GPP TS 31.102 standard, Version 15 and higher, define the GET IDENTITY command. This command is used in 5G networks to generate a SUCI. The SUCI context includes an IMSI (International Mobile Subscription ID) or NSI (Network specific ID) as identity data used to identify a subscriber in a 5G network.

The GET IDENTIY command is transmitted by the network and must be answered within six seconds, including the transmission time. This is a major problem for SEs that do not have a crypto-coprocessor or a multiplication accelerator.

A few comparisons of the computing of the SUCI on various SEs are illustrated below, from which the effect of the time saving from the advance computation of the first step 101 and/or of the second step 102 becomes apparent.

By way of example, in an SE "S3FW9FJ", to compute a "Profile A" with AVIOR 700k, the first step 101 requires 1100 milliseconds and the second step 102 requires 1101 milliseconds. If the GET IDENTITY command is executed with pre-computed keys after the first step 101 and the second step 102, only 23 milliseconds are required. In an SE "S3FW9FJ", to compute a Profile B with AVIOR 700k, the first step 101 requires 2934 milliseconds and the second step 102 requires 2938 milliseconds. If the GET IDENTITY command is executed with pre-computed keys after the first step 101 and after the second step 102, only 23 milliseconds are required. This thus makes it possible to achieve a significant increase in speed with the aid of the pre-computing in the first step 101 or additional preliminary generation of the symmetric key in the second step 102. As a result, it is possible to operate much simpler and therefore also more cost-effective SE cards in the 5G network, since a coprocessor for computing the SUCI is now no longer necessary in order to comply with the maximum time $time_{MAX}$. By pre-computing keys, it is possible to comply with the 3GPP and ETSI specification, and the performance in terms of answering/processing a GET IDENTITY command can be significantly increased.

Figure 4:
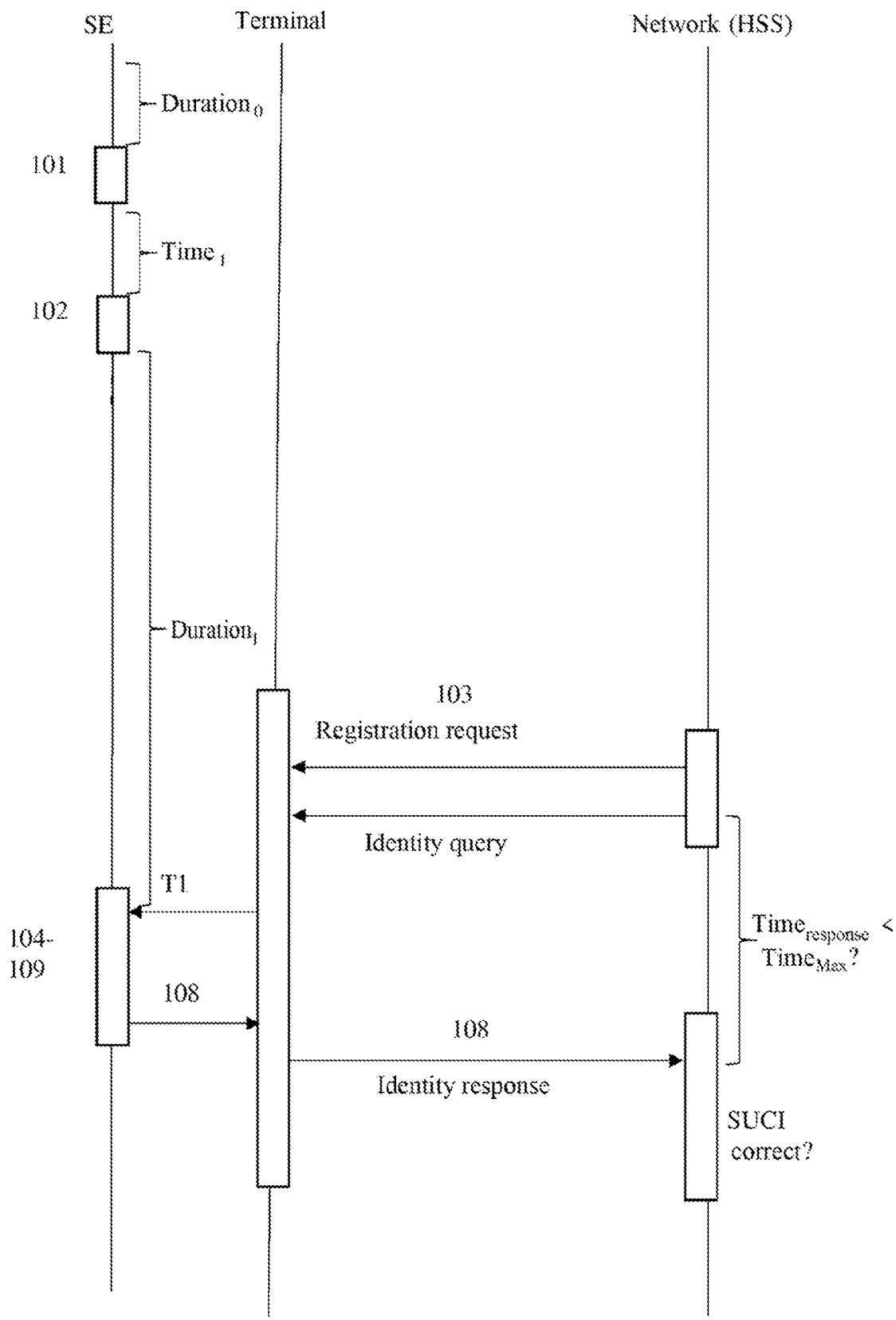
FIG. 4 shows a flowchart of a method according to the invention between an SE, a device and a network.
Figure 5:
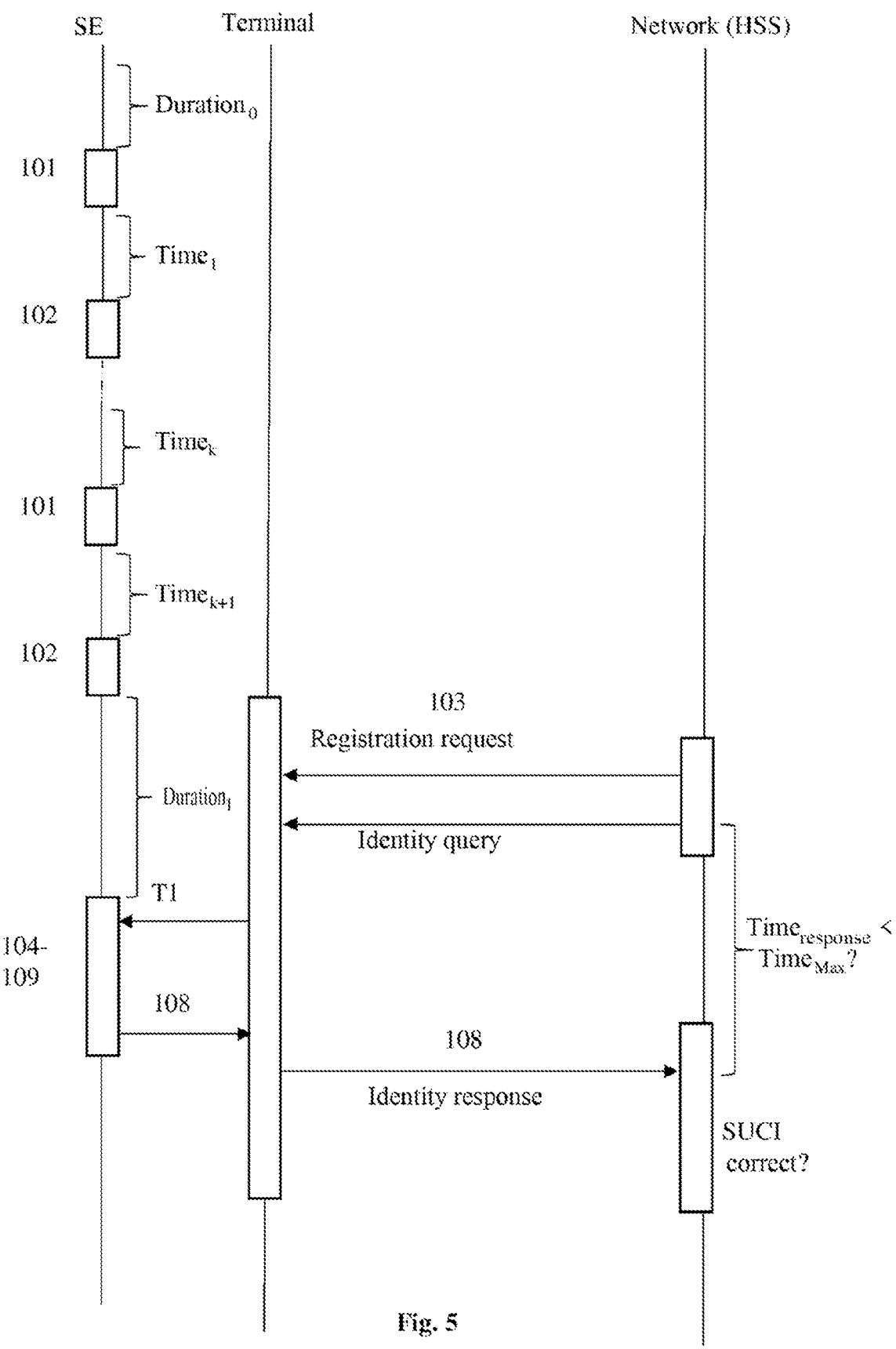
FIG. 5 shows a flowchart of a method according to the invention between an SE, a device and a network.
Figure 6:
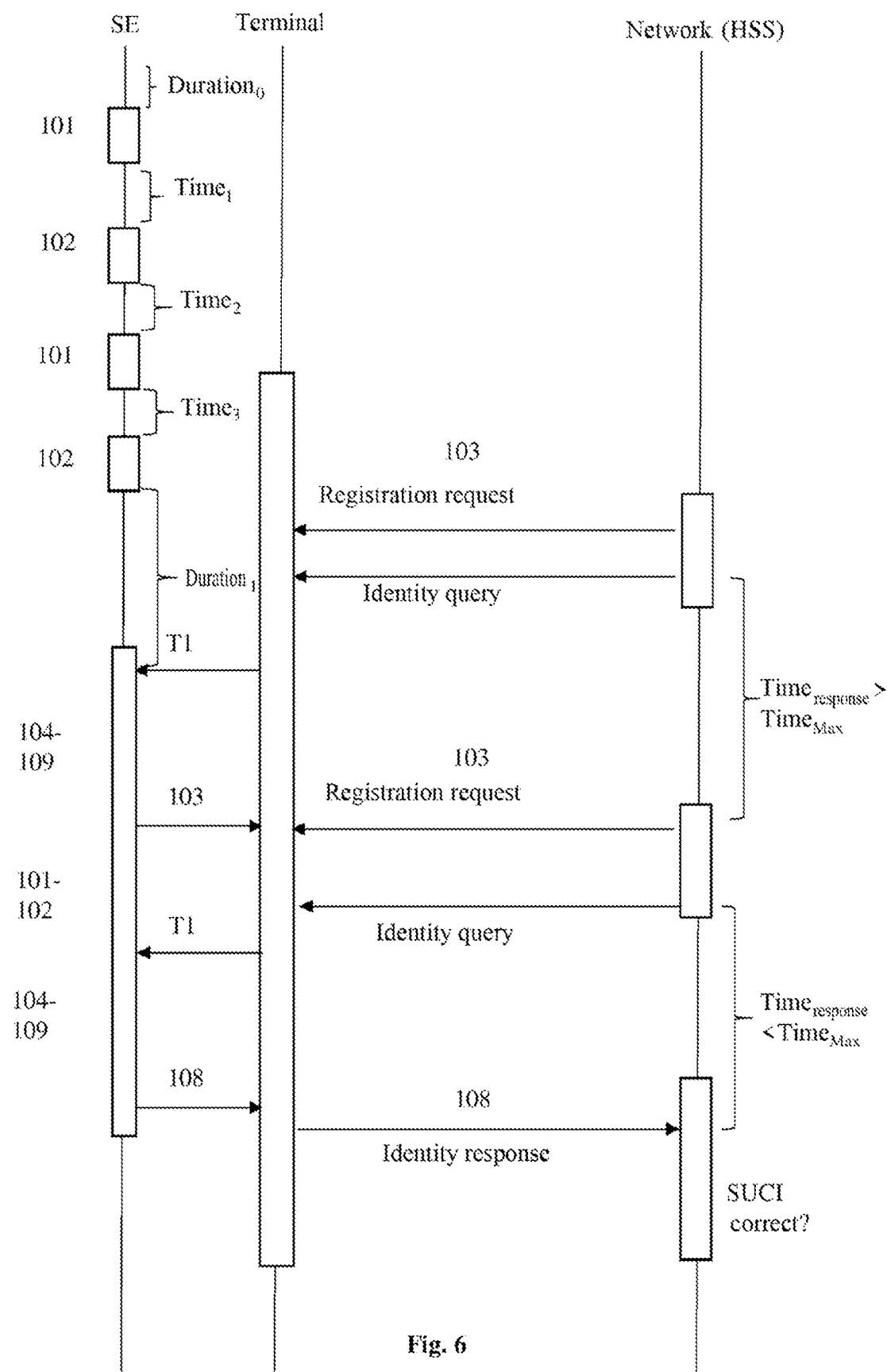
FIG. 6 shows a flowchart of a method according to the invention between an SE, a device and a network.

FIGS. 4, 5 and 6 show flowcharts of preferred exemplary embodiments for performing the method 100 according to the invention. Method steps 101 to 109 correspond to method steps 101 to 109 from FIG. 1 or FIG. 2. The SE in FIGS. 3, 5 and 6 may be a 5G USIM. FIGS. 3, 5 and 6 are described together below.

In FIG. 4, the first step 101 and the second step 102 are each executed once in the SE before the terminal receives a registration request from the network. The time between the starting of the SE and the first execution of the first step 101 is the time duration$_0$. The time between the first execution of the first step 101 and the first execution of the second step 102 is the time $time_1$.

In FIG. 5, the first step 101 and the second step 102 are each performed k times before the network makes the registration request to the terminal. The time between the k-th execution of the first step 101 and the k−1-th execution of the second step 102 is a time $time_k$. The time between the k+1-th execution of the second step 102 and the k-th execution of the first step 102 is a time $time_{k+1}$.

In FIG. 6, the first step 101 and the second step 102 are each performed twice before the network device makes the registration request to the terminal. The time between the first execution of the second step 102 and the second execution of the first step 101 is a time $time_2$. The time between the second execution of the first step 101 and the second execution of the second step 102 is a time $time_3$.

The number of executions of the first step 101 and of the second step 102 is exemplary and is not limited. It is also possible for the first step 101 and the second step 102 to be executed in different numbers or not to be executed in full. A time duration$_1$ may elapse between the last execution of the first step 101 or of the second step 102 and the identity query, since the execution of the first step 101 and/or of the second step 102 takes place in a manner decoupled from the identity query or a registration request made before it.

The registration request is intended to enable the terminal (illustrated in FIGS. 4, 5 and 6) to be able to use services of the network. To this end, the network checks the identity of the terminal and asks it for authentication/identification. The process of a registration request and authentication/identification request is described in principle in 3GPP TS 23.501. During the identification, the network transmits an identification query to the terminal. This is converted into a GET IDENTITY command in the terminal and forwarded to the SE. In the 5G network, the SE is then forced to convert the identity data, which are referred to as SUPI and comprise for example the IMSI, NSI, NAI, into a SUCI and transmit this back to the network within a period of time $time_{MAX}$ (for example 6 seconds).

If the period of time $time_{MAX}$ is exceeded, the network may send another registration request to the terminal (illustrated in FIG. 6, but not in FIGS. 3 and 4). In response thereto, the SE may start the execution of the first step 101 and/or of the second step 102 immediately, possibly with a high prioritization, or, if a sufficient number of symmetric keys $SharedK_{SE-HN}$ is still present in the non-volatile memory, wait for the next network identity query and then restart the computing of steps 104 to 109.

An IMSI is part of a subscriber identifier and should—if possible—not be read. The UICC 1 is a 5G USIM and is therefore configured to generate a SUCI based on the IMSI. It is advantageous to use the SUCI instead of the IMSI since, when transmitting the SUCI, the IMSI is not transmitted to the terminal or the network in plain text. Transmitting the SUCI would accordingly protect the security-related and/or personal information from the file $EF_{IMSI}$. The SUCI is therefore expediently transmitted as network identifier instead of the IMSI.

In order to transmit a SUCI as response to the identity query instead of an IMSI, the SUCI has to be computed. To this end, the method in FIGS. 1, 2 and 3 with steps 101 to 109 is applied. This computing may correspond to the standardized procedures according to 3GPP 23.501 and is substantially improved according to the invention by executing the first step 101 and the second step 102 in advance in order to avoid time-consuming computations after step 103 or of the network identity query T1.

The subscriber identification mechanism according to the 5G network makes it possible to identify a terminal on the over-the-air radio interface (interface 41 in FIG. 4) with the aid of the generated SUCI. When the terminal attempts to register for the first time, the SE encrypts the SUPI into a SUCI on the basis of the GET IDENTITY command and makes this SUCI available to the terminal in step 108.

The SUCI here is a data protection-friendly identifier that contains the concealed SUPI. Reference is made to FIGS. 1, 2 and 3. The SE generates in the first step 101 and in the second step 102 using the ECIES-based protection scheme with the public key of the home network $PubK_{HN}$, which was made available securely to the SE during USIM registration or during personalization.

Only the MSIN part of the SUPI is encrypted, while the home network identifier, that is to say MCC/MNC, continues to be transmitted in plain text. The data fields that make up the SUCI are "SUPI Type"; "Home Network Identifier" (for IMSI=MCC+MNC, for NAI=Domain Name"; "Routing Indicator"; "Identifier of the protection scheme: Null Scheme or Profile A or Profile B"; "Home network public key $PubK_{HN}$ identifier"; "Variable-length or hexadecimal character string, depending on the protection scheme used."

The method 100 is integrated here in an operating system 15 of the SE, and may thus be employed and used in any native SE.

Figure 7:
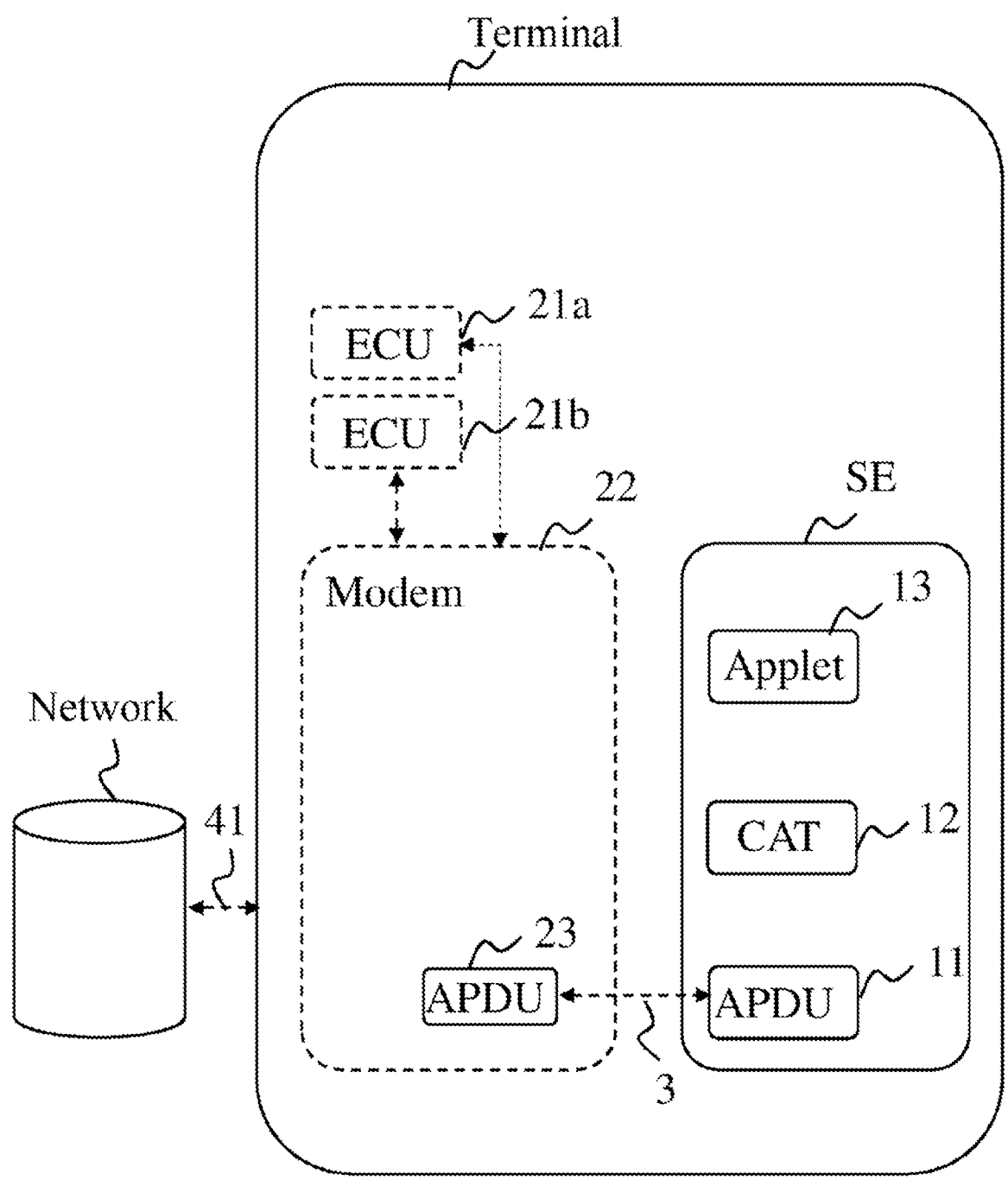
FIG. 7 shows one exemplary embodiment of a system consisting of a device having an SE and a network.

FIG. 7 shows one exemplary embodiment of a system consisting of a terminal and an SE, in which the method of FIGS. 1, 2 and 3 takes place. By way of example, the terminal is an M2M device in an IoT environment. The terminal may have a plurality of ECUs 21; two ECUs 21a and 21b are illustrated as a representation here. These ECUs 21 control the functionalities of the terminal.

The SE is inserted into the terminal ready for operation and is supplied with a supply voltage Vcc and a clock cycle CLK by the terminal. The SE is illustrated in more detail in FIG. 8. FIG. 7 indicates that the SE has applets 13. These applets 13 are able to transmit different APDU commands 11 to the terminal via a Card Application Toolkit, CAT, 12.

The terminal also comprises a modem 22. By way of example, the modem 22 may be considered to be a logic unit for converting data between the SE and a network 4. The terminal may set up a communication connection 3 to the SE via the modem 22. The communication 3 between the terminal and the SE takes place for example in accordance with the protocols defined in the international ISO/IEC 7816-3 and ISO/IEC 7816-4 standards, to which reference is hereby expressly made.

The entire data exchange between SE and the terminal preferably takes place using what are known as APDUs (Application Protocol Data Units) according to the ISO/IEC 7816-4 standard. An APDU constitutes a data unit on the application layer, that is to say a kind of container using which commands and/or data are transmitted to the SE. A distinction is made between command APDUs transmitted from a terminal to the SE and response APDUs transmitted from the SE to the terminal in response to a command APDU.

The modem 22 is a communication unit of the terminal, in order also to exchange data from the terminal or the SE via a communication interface 41 with the network, for example a server of a network operator. The data exchanged between the SE and the modem 22 may be converted into an IP-based connection protocol in the modem 22.

Figure 8:
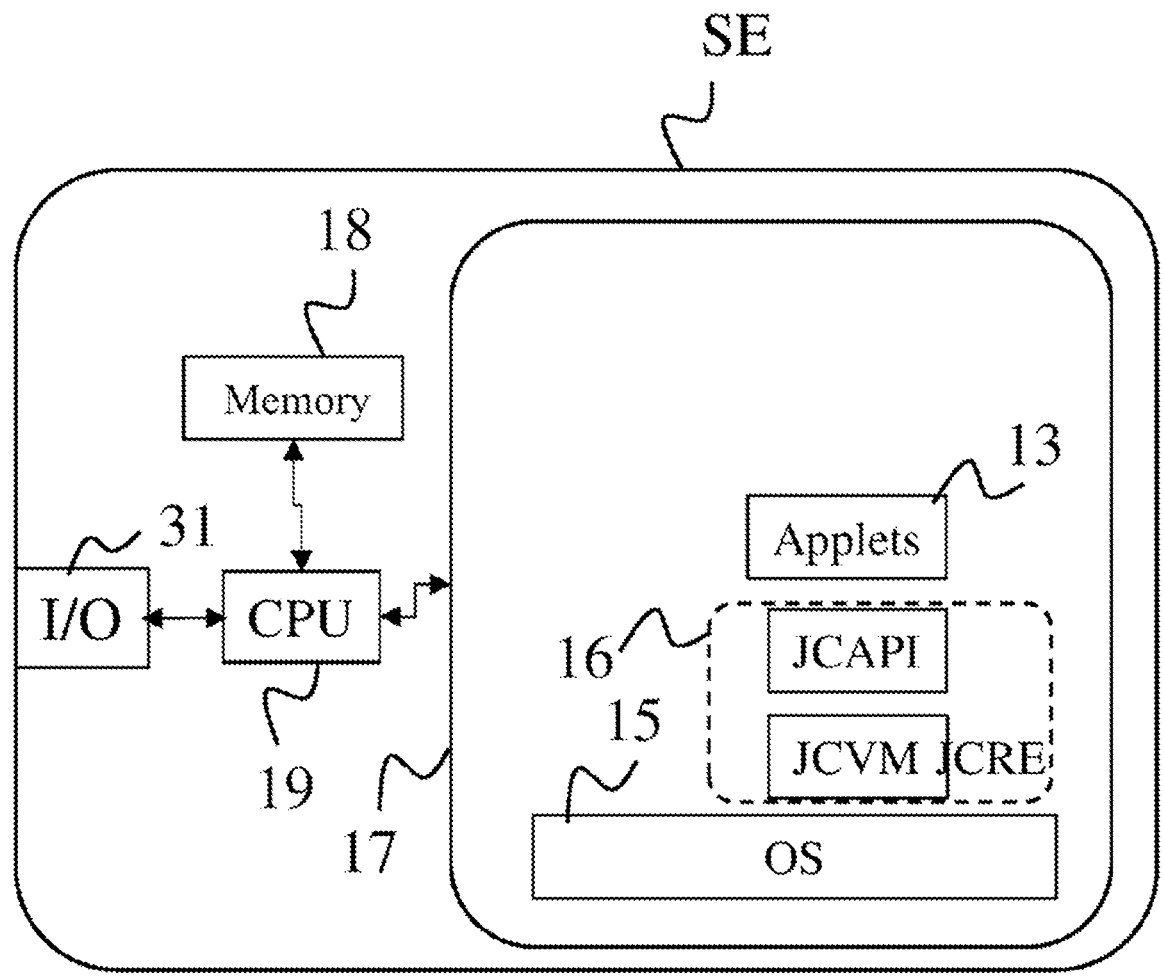
FIG. 8 shows one exemplary embodiment of an SE.

FIG. 8 shows a block diagram of an SE according to the invention, preferably a hard-wired eUICC. As an alternative, the SE is a portable data carrier with a different design. The SE has an operating system 15 in which the method 100 according to FIG. 1, FIG. 2 and FIG. 3 takes place. By way of example, the operating system 15 is a native operating system. It is also conceivable for the operating system 15 to be configured to operate a Java Card runtime environment, JCRE, 16.

The SE is designed to exchange data with the terminal according to FIG. 7. For data transmission and communication between the SE and the terminal, both the SE and the terminal each have suitable communication interfaces 31. The interfaces may be designed for example such that the communication between them or between the SE and the terminal are connected galvanically, that is to say with contact. The contact assignment is defined in ISO/IEC 7816. In one embodiment, not illustrated, the communication interface is contactless, for example in accordance with an RFID or NFC or WLAN standard. The terminal may forward a network identity query to the SE (transition T1 of the method 100 in FIG. 1, FIG. 2 or FIG. 3).

The SE additionally has a central processor or control unit, CPU 19, which has a communication connection to the interface 31. The primary tasks of the CPU 19 include executing arithmetic and logic functions and accessing (reading, writing, changing, overwriting, creating and/or deleting) files in the SE, as defined by program code executed by the CPU 19. The files are for example elementary files, EF, in a file directory, Directory Files, DF, of a root directory or a profile directory of the SE of a non-volatile memory 17. The CPU 19 is also connected to a volatile working memory, RAM 18, and the non-volatile rewritable memory 17. The non-volatile memory 17 is preferably a flash memory (flash EEPROM). By way of example, it may be a flash memory with a NAND or NOR architecture. The control unit 19 is additionally configured to execute steps 101 to 108 of the method of FIG. 1, FIG. 2 and FIG. 3 when corresponding program code is executed.

In the preferred embodiment illustrated in FIG. 8, the program code is stored in the non-volatile memory 17 and is able to be executed by the CPU 19. In particular, the non-volatile memory 17 may store the program code of the chip card operating system, OS, 15, of the Java Card runtime environment, JCRE, 16 (consisting of Java Card Virtual Machine, JCVM and Java Card Application Programming Interfaces, JCAPI), application 13. The application 13 here is preferably present in the form of Java Card™ applets. In addition, the CAT 12 shown in FIG. 7 is incorporated in accordance with ETSI TS 102 223.

Modern terminals, such as smartphones, contain a chipset, which may comprise a plurality of chips or processors, in particular an application processor, a baseband processor, and optionally a specially secured secure processing unit SPU (none of which are illustrated in FIG. 1, FIG. 2 and FIG. 3). For the future 5G mobile communication standard currently under development, the concept of the integrated UICC, iUICC, is being proposed, in which the functionality of a USIM card or of a UICC is integrated in a manner distributed in the chipset, that is to say in one or more chips or processor(s), of the terminal. It is highly advantageous in terms of costs if this chipset does not have a cryptoprocessor or hardware accelerator, which is made possible by the present method.

Within the scope of the invention, all of the elements described and/or shown and/or claimed may be combined with one another as desired.

The invention claimed is:

1. A method in a secure element (SE) for generating at least one symmetric key and one SE-specific cryptographic key pair for creating and transmitting a response to an identity query, including a GET IDENTITY command, transmitted by a network, comprising the following method steps:
   first step: generating, in the SE, at least one SE-specific cryptographic key pair on the basis of an elliptic curve cryptography (ECC) algorithm and storing the at least one SE-specific cryptographic key pair in a non-volatile memory; and
   second step: generating, in the SE, the at least one symmetric key using the stored private key part of the first SE-specific cryptographic key pair and a public key part of a network key pair in the SE and storing the symmetric key in the non-volatile memory,
   wherein the first step and/or the second step are/is already executed prior to receiving the identity query transmitted by the network,
   wherein the symmetric key generated in the second step is used to create and transmit the response to the identity query transmitted by the network,
   wherein the start of the execution of the second step takes place in temporally decoupled fashion after the execution of the first step, and
   wherein an ECC algorithm to be used is ascertained in order to perform the first step, and/or
   a current public key part of a network key pair is ascertained in order to perform the second step.

2. The method according to claim 1, wherein the execution of the first step and/or of the second step may be at least temporarily paused and/or aborted if at least one further task is executed on the SE.

3. The method according to claim 1, wherein it is determined, depending on a prioritization, whether the first step and/or the second step are/is executed and/or paused and/or aborted in order to execute at least one further task,
   wherein the prioritization of the first step and/or of the second step compared to the at least one further task on the SE depends on the number of SE-specific cryptographic key pairs already stored in the non-volatile memory and/or on the number of symmetric keys already stored in the non-volatile memory.

4. The method according to claim 1, wherein, for the check as to whether at least one SE-specific cryptographic key pair present in the non-volatile memory is valid, it is checked whether the computing method for the ascertainment has changed.

5. The method according to claim 1, wherein, for the check as to whether at least one public key part, used to determine a symmetric key present in the non-volatile memory, of a network key pair is valid, it is checked whether the public key part of the network key pair has changed.

6. The method according to claim 1, comprising the following method steps:
   recognizing that the creation and transmission of the response to the identity query transmitted by the network exceeds a maximum time or that the identity query has not already been accepted by the network,
   the network transmitting a registration request and the SE creating and transmitting another response in response to the reception of the registration request from the network according to the method comprising the following method steps:
   receiving, in the SE, the identity query transmitted by the network;
   checking whether at least one SE-specific cryptographic key pair present in the non-volatile memory is valid, and/or
   checking whether at least one public key part, used to determine a symmetric key present in the non-volatile memory, of a network key pair is valid,
   generating a symmetric key by executing a second step if, in the checking step, no valid public key part of a network key pair was identified but at least one valid SE-specific cryptographic key pair is present in the non-volatile memory,
   wherein the second step comprises generating, in the SE, the at least one symmetric key using a stored private key part of the first SE-specific cryptographic key pair and a current public key part of a network key pair; or
   generating the symmetric key by executing a first step and the second step in the SE if, in the checking step, no valid SE-specific cryptographic key pair is present in the non-volatile memory,
   wherein the first step comprises generating, in the SE, the at least one SE-specific cryptographic key pair on the basis of an ECC algorithm;
   the SE encrypting identity data stored on the SE, so as to generate encrypted identity data using the symmetric key generated in one of the previous generation steps, or a symmetric key that is present in the non-volatile memory;
   the SE applying a message authentication code algorithm to the generated encrypted identity data so as to obtain a message authentication code (MAC); and
   transmitting a response to the identity query from the SE to the network,
   wherein the response contains the public key part of the SE-specific cryptographic key pair, the encrypted identity data, and the MAC.

7. The method according to claim 1, wherein the symmetric key and/or the public part and/or the private part of the SE-specific cryptographic key pair is deleted after at least one of these keys has been used to create and transmit the response to the identity query transmitted by the network.

8. The method according to claim 1, wherein a new symmetric key and/or a new SE-specific cryptographic key pair are/is created and stored in the non-volatile memory only
   when a maximum number of symmetric keys and/or SE-specific cryptographic key pairs in the non-volatile memory has not yet been exceeded and/or
   a memory requirement for the symmetric key and/or the SE-specific cryptographic key pairs does not yet exceed a predefined memory space in the non-volatile memory.

9. The method according to claim 1, wherein the maximum number of symmetric keys to be generated and/or the SE-specific cryptographic key pairs is defined upon initialization and/or activation of the SE or of the terminal, and/or the predefined memory space is reserved in the non-volatile memory upon initialization.

10. The method according to claim 1, wherein the first step and/or the second step are/is executed at least once in the SE following reception of a STATUS command or a SELECT command.

11. A method in a secure element (SE) for creating and transmitting a response to an identity query, including a GET IDENTITY command, transmitted by a network, comprising the following method steps:
receiving, in the SE, the identity query transmitted by the network;
checking whether at least one SE-specific cryptographic key pair present in the non-volatile memory is valid,
checking whether at least one public key part, used to determine a symmetric key present in the non-volatile memory, of a network key pair is valid,
generating a symmetric key by executing a second step if, in the checking step, no valid public key part of a network key pair was identified but at least one valid SE-specific cryptographic key pair is present in the non-volatile memory,
wherein the second step comprises generating, in the SE, the at least one symmetric key using a stored private key part of the first SE-specific cryptographic key pair and a current public key part of a network key pair; or
generating the symmetric key by executing a first step and the second step in the SE if, in the checking step, no valid SE-specific cryptographic key pair is present in the non-volatile memory,
wherein the first step comprises generating, in the SE, the at least one SE-specific cryptographic key pair on the basis of an elliptic curve cryptography (ECC) algorithm;
the SE encrypting identity data stored on the SE, so as to generate encrypted identity data using the symmetric key generated in one of the previous generation steps, or a symmetric key that is present in the non-volatile memory;
the SE applying a message authentication code algorithm to the generated encrypted identity data so as to obtain a message authentication code (MAC); and
transmitting a response to the identity query from the SE to the network,
wherein the response contains the public key part of the SE-specific cryptographic key pair, the encrypted identity data, and the MAC.

12. A secure element (SE) including a fifth-generation subscriber identity module, having:
an interface, configured to receive an identity query, including a GET IDENTITY command, transmitted by a network;
a non-volatile memory configured to store identity data, including in at least one file; and
an electronic control unit configured to:
generate in the SE, in a first step, at least one SE-specific cryptographic key pair on the basis of an elliptic curve cryptography (ECC) algorithm and storing the at least one SE-specific cryptographic key pair in a non-volatile memory; and
generate in the SE, in a second step, the at least one symmetric key using the stored private key part of the first SE-specific cryptographic key pair and a public key part of a network key pair in the SE and storing the symmetric key in the non-volatile memory,
wherein the first step and/or the second step are/is already executed prior to receiving the identity query transmitted by the network,
wherein the symmetric key generated in the second step is used to create and transmit the response to the identity query transmitted by the network,
wherein the start of the execution of the second step takes place in temporally decoupled fashion after the execution of the first step, and
wherein an ECC algorithm to be used is ascertained in order to perform the first step, and/or a current public key part of a network key pair is ascertained in order to perform the second step.

13. The SE according to claim 12, furthermore comprising:
an operating system, stored executably in the non-volatile memory and configured, when it is executed in the control unit, to perform the steps of generating at least one symmetric key and/or one SE-specific cryptographic key pair for creating and transmitting a response to an identity query transmitted by the network.

14. A computer program product stored on a storage medium and installed executably in a secure element (SE), including a fifth-generation subscriber identity module, and having an electronic control unit;
wherein the computer program product is executable by the electronic control unit in the secure element to:
generate in the SE, in a first step, at least one SE-specific cryptographic key pair on the basis of an elliptic curve cryptography (ECC) algorithm and storing the at least one SE-specific cryptographic key pair in a non-volatile memory; and
generate in the SE, in a second step, the at least one symmetric key using the stored private key part of the first SE-specific cryptographic key pair and a public key part of a network key pair in the SE and storing the symmetric key in the non-volatile memory,
wherein the first step and/or the second step are/is already executed prior to receiving the identity query transmitted by the network,
wherein the symmetric key generated in the second step is used to create and transmit the response to the identity query transmitted by the network,
wherein the start of the execution of the second step takes place in temporally decoupled fashion after the execution of the first step, and
wherein an ECC algorithm to be used is ascertained in order to perform the first step, and/or a current public key part of a network key pair is ascertained in order to perform the second step.

15. A system comprising:
an electronic secure element (SE), including a fifth-generation subscriber identity module, and a network,
wherein the electronic SE includes an electronic control unit and a non-volatile memory;
wherein the non-volatile memory includes instructions that are executable by the electronic control unit to cause the system to:
generate in the SE, in a first step, at least one SE-specific cryptographic key pair on the basis of an elliptic curve cryptography (ECC) algorithm and storing the at least one SE-specific cryptographic key pair in a non-volatile memory; and
generate in the SE, in a second step, the at least one symmetric key using the stored private key part of the first SE-specific cryptographic key pair and a public key part of a network key pair in the SE and storing the symmetric key in the non-volatile memory, wherein the first step and/or the second step are/is already executed prior to receiving the identity query transmitted by the network, wherein the symmetric key generated in the second step is used to create and transmit the response to the identity query transmitted by the network, wherein the start of the execution of the second step takes place in temporally decoupled fashion after the execution of the first step, and wherein an ECC algorithm to be used is ascertained in order to perform the first step, and/or a current public key part of a network key pair is ascertained in order to perform the second step.

* * * * *